(12) United States Patent
Kaneko

(10) Patent No.: US 12,352,964 B2
(45) Date of Patent: Jul. 8, 2025

(54) GLASSES-TYPE WEARABLE INFORMATION DEVICE, METHOD FOR GLASSES-TYPE WEARABLE INFORMATION DEVICE, AND STORAGE MEDIUM

(71) Applicant: CANON KABUSHIKI KAISHA, Tokyo (JP)

(72) Inventor: Tsuyoshi Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/507,878

(22) Filed: Nov. 13, 2023

(65) Prior Publication Data

US 2024/0077725 A1  Mar. 7, 2024

Related U.S. Application Data

(63) Continuation of application No. 17/525,389, filed on Nov. 12, 2021, now Pat. No. 11,852,810.

(30) Foreign Application Priority Data

Nov. 19, 2020  (JP) .................................. 2020-192831

(51) Int. Cl.
*G02B 27/01* (2006.01)
*H04M 1/72433* (2021.01)

(52) U.S. Cl.
CPC ...... *G02B 27/017* (2013.01); *H04M 1/72433* (2021.01); *G02B 2027/014* (2013.01); *G02B 2027/0178* (2013.01)

(58) Field of Classification Search
CPC .............. G02B 27/017; G02B 27/0179; G02B 2027/014; G02B 2027/0178; G02B 2027/0187; H04M 1/72433; H04M 1/724094; H04N 13/332; H04N 13/363; H04N 13/398
USPC .......................................................... 345/8
See application file for complete search history.

(56) References Cited

U.S. PATENT DOCUMENTS

| | | | |
|---|---|---|---|
| 9,578,156 B2* | 2/2017 | Lee ..................... | H04W 68/005 |
| 10,037,084 B2* | 7/2018 | Joo ........................ | G06T 19/006 |
| 11,852,810 B2* | 12/2023 | Kaneko ............. | H04M 1/72433 |
| 12,169,660 B2* | 12/2024 | Imai ....................... | G09G 3/001 |
| 2015/0338924 A1* | 11/2015 | Watanabe .............. | H04N 23/61 |
| | | | 345/156 |

(Continued)

FOREIGN PATENT DOCUMENTS

| | | |
|---|---|---|
| JP | 2017050810 A | 3/2017 |
| JP | 2019021088 A | 2/2019 |

(Continued)

OTHER PUBLICATIONS

Tamura, E., et a., "Robot Control Interface System Using Glasses-Type Wearable Devices", 2016. pp. 247-256.

*Primary Examiner* — Jason M Mandeville
(74) *Attorney, Agent, or Firm* — Canon U.S.A., Inc., IP Division

(57) ABSTRACT

A glasses-type wearable information device transfers, when a notification from an application is received, the notification to another wearable terminal in a case where the glasses-type wearable information device is not in use, and does not perform display control to project the notification into a field of vision of a user.

7 Claims, 8 Drawing Sheets

(56) References Cited

U.S. PATENT DOCUMENTS

2015/0341901 A1* 11/2015 Ryu .................. H04W 4/20
                                                            455/458
2017/0289329 A1* 10/2017 Yim .................. H04W 88/02

FOREIGN PATENT DOCUMENTS

| WO | 2016001984 A1 | 1/2016 |
| WO | 2019246516 A1 | 12/2019 |

* cited by examiner

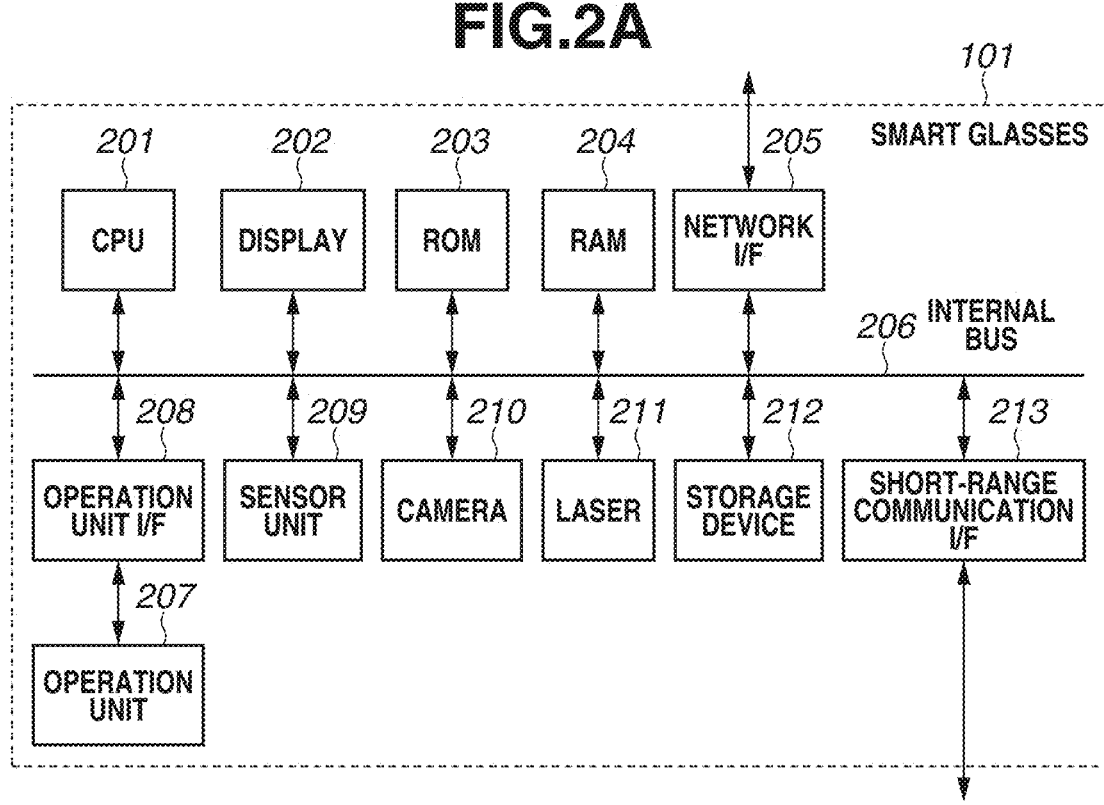
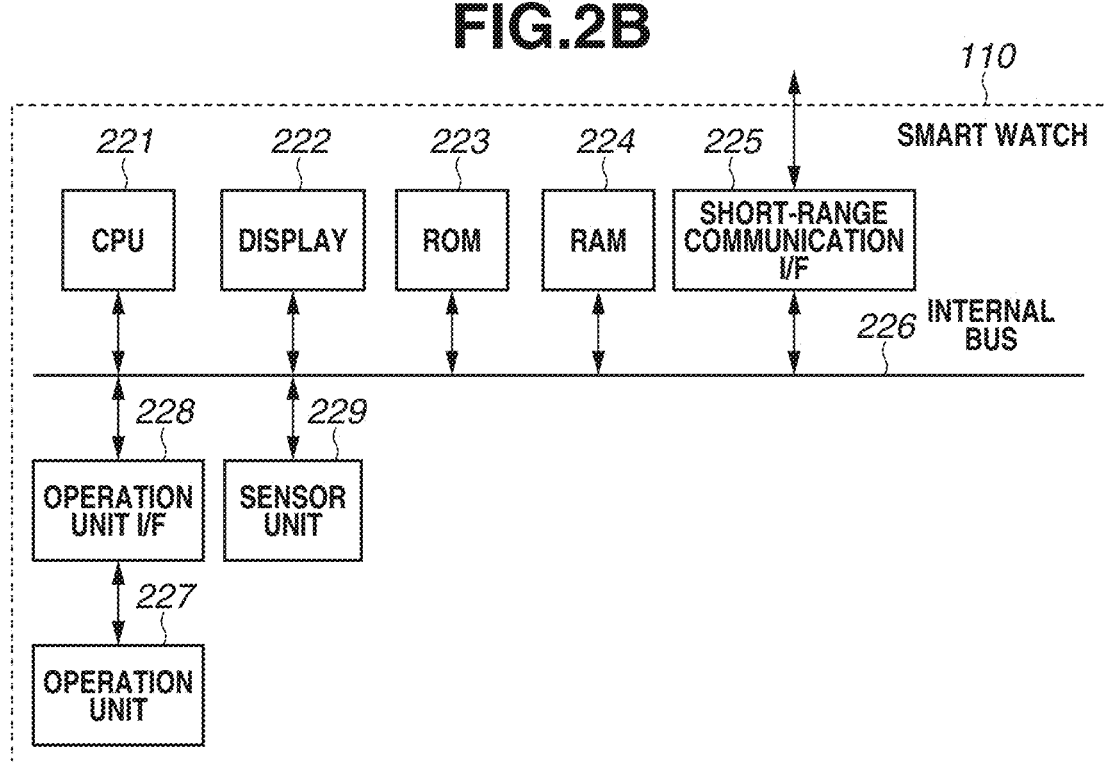

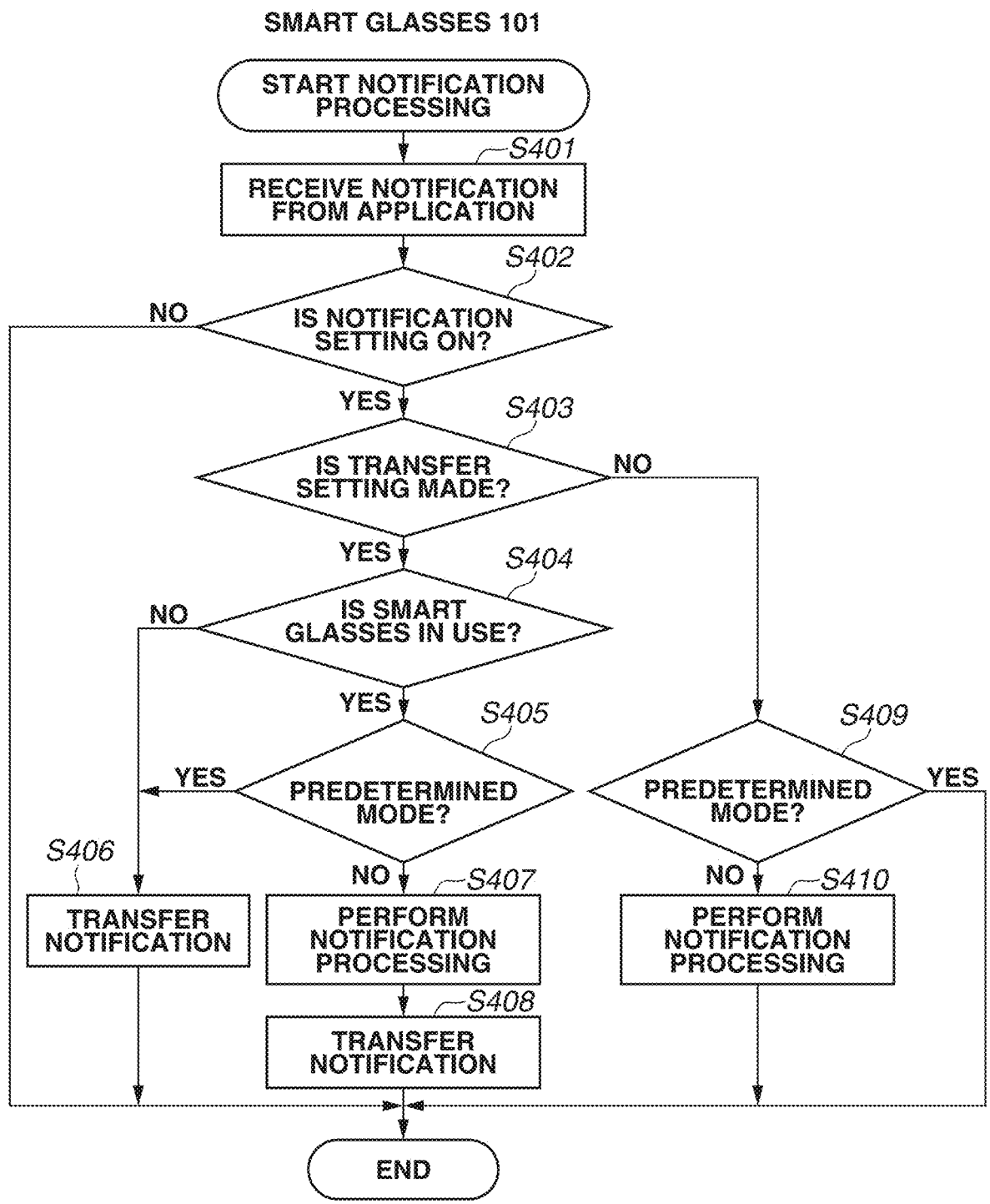

NOTIFICATION IN FIELD OF VISION VIA SMART GLASSES

NOTIFICATION BY DISPLAY UNIT OF SMART WATCH

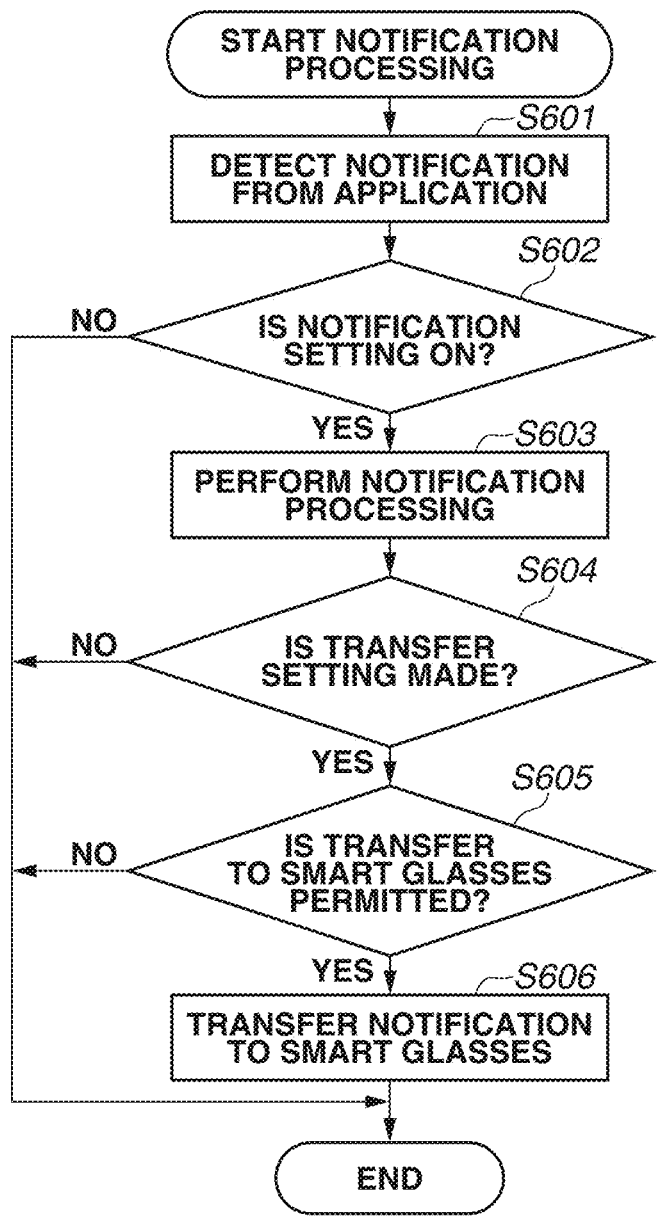

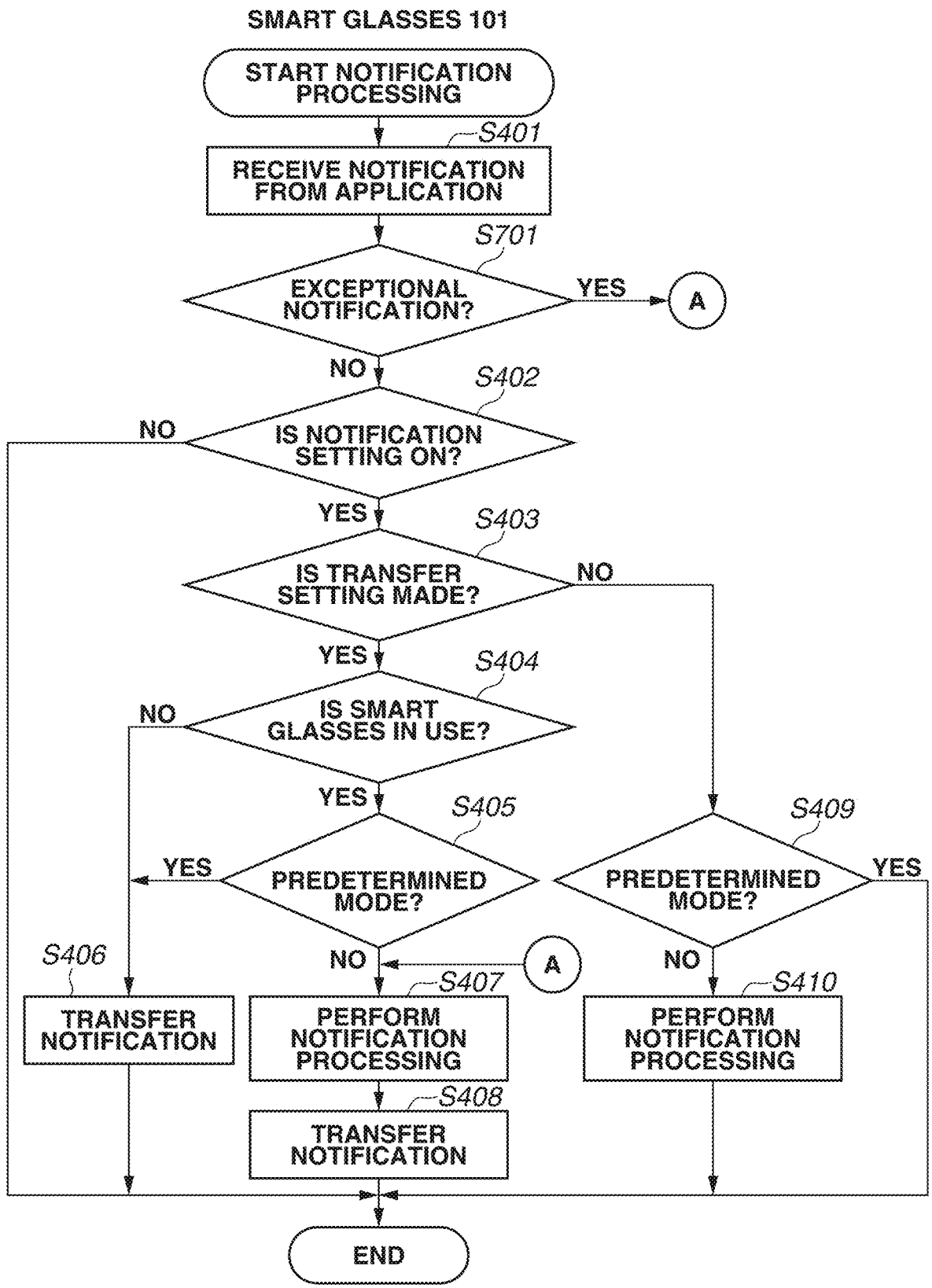

```
<<NOTIFICATION SETTINGS>>
NOTIFICATION SETTING FOR EACH MODE ~801
   - CONCENTRATION MODE    [  ] OFF
   - DRIVE MODE            [  ] OFF
   - POWER SAVE MODE       [  ] ON
                          ~802
TRANSFER NOTIFICATION TO PAIRED DEVICE  [  ] ON
   NOTIFICATION BY GLASSES IS RESTRICTED [  ] ON
   WHEN GLASSES ARE NOT IN USE
TRANSFER ALL NOTIFICATIONS ~804  803 [  ] OFF
   SETTING FOR EACH APPLICATION ~805
   - Application 0001      [  ] ON
   - Application 0002      [  ] ON
```

GLASSES-TYPE WEARABLE INFORMATION DEVICE, METHOD FOR GLASSES-TYPE WEARABLE INFORMATION DEVICE, AND STORAGE MEDIUM

CROSS-REFERENCE TO RELATED APPLICATIONS

This is a continuation application of U.S. patent application Ser. No. 17/525,389 filed on Nov. 12, 2021 which claims the benefit of Japanese Patent Application No. 2020-192831, filed Nov. 19, 2020, both of which are hereby incorporated by reference herein in their entirety.

BACKGROUND

Field

The present disclosure relates to a technique relating to controlling communication between a glasses-type wearable information device and another device. The glasses-type wearable information device is mounted near one lens or both lenses of, for example, smart glasses having, for example, a communication function and a function of providing a video to a field of vision of the user.

Description of the Related Art

Glasses-type wearable information devices called smart glasses, a head-mounted display (HMD), and the like have been available as one of wearable terminals. Examples of the glasses-type wearable information devices include a device that has, in addition to the communication function, a function of providing a video to a field of vision of a human via glasses, such as a virtual reality (VR) function and an augmented reality (AR) function. In some cases, the glasses-type wearable information device communicates with another wearable terminal.

A smartphone that has come into widespread use also has a function of cooperating with a wearable terminal. For example, Japanese Unexamined Patent Application Publication No. 2017-509172 discusses that a mobile device is configured to push at least several pieces of information (e.g., address information) directly to a wearable-type electronic device via local wireless connection (e.g., Bluetooth® and Wireless Fidelity (Wi-Fi)).

The glasses-type wearable information device is expected to be used in substitution for a smartphone or the like in the future by being connected to a mobile network (a mobile communication network, the Internet, or the like). In such a case, the glasses-type wearable information device can be assumed to implement a function of making a push notification to another wearable terminal or other functions that have been performed by the smartphone in substitution for the smartphone.

However, the glasses-type wearable information device can be brought into a state different from that of the smartphone, such as a state in which the glasses-type wearable information device is being worn and a state in which the glasses-type wearable information device is not worn and is folded. In such cases, sufficient consideration has not been given to a point regarding how to provide an event received by the glasses-type wearable information device (e.g., reception of an email and notification from an application) to a user.

SUMMARY

According to an aspect of the present disclosure, a glasses-type wearable information device includes at least one memory storing instructions, and at least one processor executing the instructions causing the glasses-type wearable information device to perform, in a case where the glasses-type wearable information device is being worn by a user and is in use when a notification is issued from an application, display control to project a video regarding the notification into a field of vision of the user, and transfer, in a case where the glasses-type wearable information device is not being worn by the user and is not in use when the notification is issued from the application, the notification to another wearable terminal in cooperation with the glasses-type wearable information device. In a case where the notification is transferred because the glasses-type wearable information device is not being worn by the user and is not in use when the notification is issued from the application, display control for the video regarding the notification is not performed.

Further features of the present disclosure will become apparent from the following description of exemplary embodiments with reference to the attached drawings.

BRIEF DESCRIPTION OF THE DRAWINGS

FIGS. 2A and 2B are diagrams illustrating hardware configuration examples of the glasses-type wearable information device and the other wearable terminal, respectively, according to the present disclosure.

FIG. 4 is a flowchart illustrating notification control processing which is performed by the glasses-type wearable information device according to a first exemplary embodiment.

FIG. 6 is a flowchart illustrating notification control processing which is performed by the wearable terminal in cooperation with the glasses-type wearable information device according to a second exemplary embodiment.

FIG. 7 is a flowchart illustrating notification control processing which is performed by the glasses-type wearable information device according to a third exemplary embodiment.

DESCRIPTION OF THE EMBODIMENTS

Exemplary embodiments to implement the present disclosure will be described below with reference to the accompanying drawings.

Figure 1:
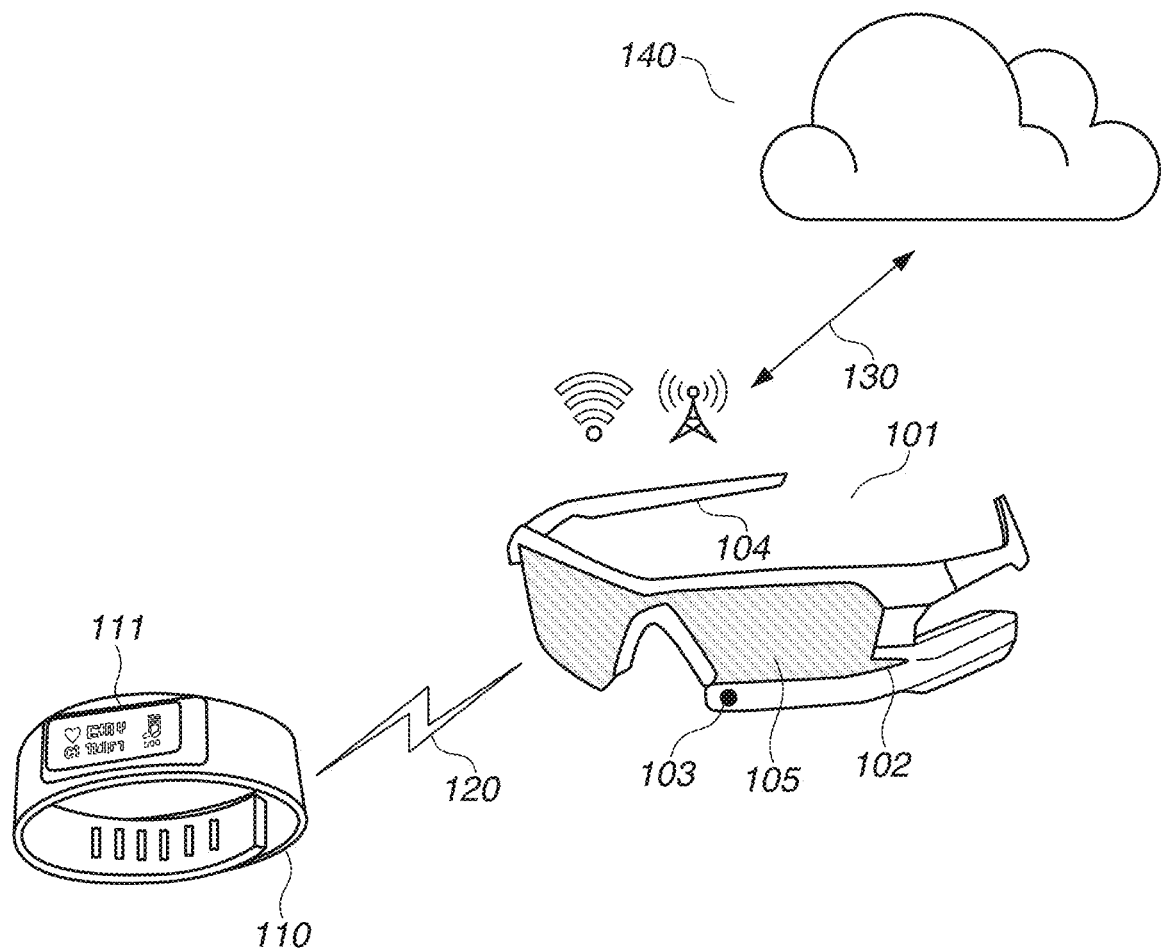
FIG. 1 illustrates an example of a system configuration diagram including a glasses-type wearable information device and another wearable terminal.

A first exemplary embodiment of the present disclosure will be described below. FIG. 1 illustrates an example of a system configuration diagram including a glasses-type wearable information device and a wearable terminal that cooperates with the glasses-type wearable information device.

The glasses-type wearable information device is capable of communicating with a mobile network (mobile communication network) 130 and the Internet 140 directly or via a mobile router (not illustrated), and is exemplified by smart glasses 101 in the present disclosure. Monocular smart glasses, a head-mounted display, and the like are applicable as the glasses-type wearable information device. The wearable terminal is an information device having a notification function, such as a display function and a vibration function, and a communication function, such as Bluetooth®, that enables communication with the glasses-type wearable information device, and is exemplified by a smart watch 110 in the present disclosure.

The smart glasses 101 are a wearable-type information terminal to be worn near the eyes of a user, and a video, which is a virtual image, is displayed on a display unit 102 in a field of vision of the user without obstructing the field of vision of the user. Such a display method is referred to as augmented reality (AR) method or mixed reality (MR) method, and is provided by a function of projecting information onto a transmissive-type display (lens 105) or retinas (not illustrated) of the user. While FIG. 1 illustrates the smart glasses 101 that provide a video for one eye, the smart glasses 101 that project a video into fields of visions for both eyes are applicable in the present disclosure.

The display unit 102 is provided with a camera unit 103 for capturing an image of an object in a line-of-sight direction of the user. A frame 104 includes a touch sensor while serving as a frame, and is an operation frame unit for operating the smart glasses 101. The frame 104 incorporates a speaker function therein, and is capable of transmitting sound to the user.

The smart glasses 101 can incorporate therein a built-in module, such as an embedded subscriber identity module (eSIM), and can be connected to the Internet 140 via the mobile network 130 that uses a fourth generation (4G) or fifth generation (5G) network. The smart glasses 101 can also be connected using a mobile router of the user, and Wireless Fidelity (Wi-Fi), a universal serial bus (USB), or the like to be connected to the mobile network 130 via the mobile router. The smart glasses 101 can also be connected to the Internet 140 via the Wi-Fi or the like bypassing the mobile network 130.

The smart watch 110 is a wristwatch-type information terminal to be worn around a wrist of the user. A display unit 111 not only displays information such as a time, but also functions as a touch panel to enable the operation of the smart watch 110. Wireless communication 120 is used for smart glasses 101 and the smart watch 110 to exchange data therebetween. The wireless communication 120 is assumed to be wireless communication in conformity with the Bluetooth® standard, but is not limited thereto. The smart watch 110 has, other than a display function, a notification function by way of a vibration function.

FIGS. 2A and 2B are diagrams illustrating hardware configuration examples of the respective devices according to the present disclosure. FIG. 2A is a diagram illustrating a hardware configuration of the smart glasses 101.

A central processing unit (CPU) 201 performs overall control of various functions of the smart glasses 101 via an internal bus 206 using a program stored in a read-only memory (ROM) 203. A display 202 can display a result of execution of the program by the CPU 201 by way of projection as a video in the field of vision of the user. A display method according to the present exemplary embodiment is assumed to be a method in which the user watches a video projected into the field of vision by the display 202 via the transmissive-type lens 105. However, a method in which the display 202 directly projects a video into retinas or the like can also be employed. The ROM 203 is a flash memory or the like, and stores therein various types of setting information, an application program, and the like, as described above. A random-access memory (RAM) 204 functions as a memory and work area of the CPU 201. A network interface (I/F) 205 is a hardware module for connecting to the mobile network 130 or the Wi-Fi. In a case where the mobile router is used, the smart glasses 101 can be connected to the mobile network 130 or the Wi-Fi using a USB I/F (not illustrated) of the smart glasses 101.

An operation unit 207 accepts an input from the user with the frame 104 and transmits a signal corresponding to the input to each processing unit described above using an operation unit I/F 208. One or more sensors are illustrated as a sensor unit 209 in a simplified manner. Specifically, at least any one of a global positioning system (GPS), a gyro sensor, an acceleration sensor, a proximity sensor, a blood pressure/heart rate measurement sensor, and the like is mounted on the smart glasses 101. A sensor for detecting biological information for implementing fingerprint authentication, vein authentication, iris verification, or the like may be mounted on the smart glasses 101. A camera 210 has an imaging function, and captured image data is stored in a memory of the smart glasses 101. A laser 211 projects various types of content into the display 202. In a case of a retina projection method, the laser 211 directly projects the content into retinas. A storage device 212 is a storage medium, and stores therein various types of data of an application or the like. The storage device 212 includes a device that reads out data of the storage medium and a device that deletes data in the storage medium. The terminal may include, depending on its type, only the memory without including the storage device 212. A short-range communication I/F 213 is an interface which is used for communication with the smart watch 110 or the like, and implements, for example, the wireless communication 120.

Although not illustrated, the smart glasses 101 can further include a configuration for implementing a voice call using a network or a telephone line so as to be used in substitution for a modern smartphone. Specifically, components for connection to the telephone line, a speaker, a microphone, a voice control chip, and the like are supposed to be mounted on the smart glasses 101.

FIG. 2B is a diagram illustrating a hardware configuration of the smart watch 110.

A CPU 221 performs overall control of various functions of the smart watch 110 via an internal bus 226 using a program stored in a ROM 223. A result of an application program executed by the CPU 221, a notification from the smart glasses 101, and the like are displayed on a display 222. The ROM 223 is a flash memory or the like, and stores therein various types of setting information, the application program, and the like, as described above. A RAM 224 functions as a memory and work area of the CPU 221. A short-range communication I/F 225 controls the smart watch 110 to transmit data in one-way communication or exchange data in bidirectional communication with an external network device via the wireless communication 120. An operation unit 227 receives an input from the user with the display unit 111 and transmits a signal corresponding to the input to each processing unit described above using an operation unit I/F 228. A configuration in which the display 222 and the operation unit 227 are integrated in a form of, for example, a touch panel can also be implemented. One or more sensors are illustrated as a sensor unit 229 in a simplified manner.

Specifically, at least any one of a GPS, a gyro sensor, an acceleration sensor, a proximity sensor, a blood pressure/heart rate measurement sensor, and the like is mounted on the smart watch 110. A sensor for detecting biological information for implementing fingerprint authentication, vein authentication, iris verification, or the like may be mounted on the smart watch 110.

As described above, the smart glasses 101 can further execute software for implementing a call function by voice.

Figure 3A:
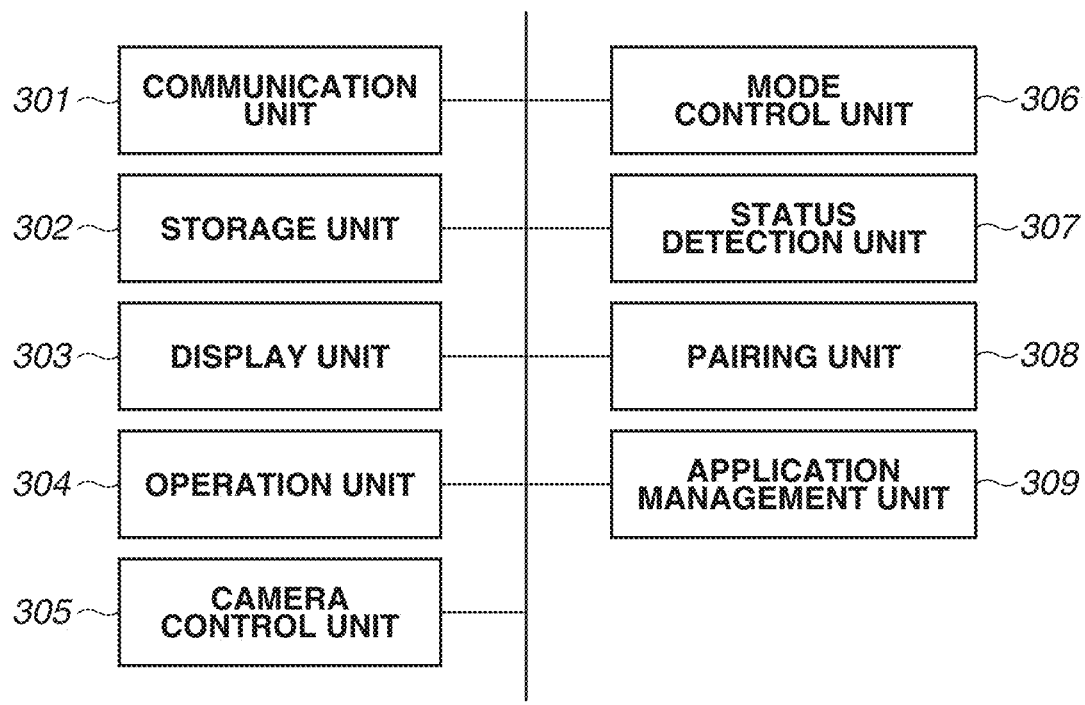
FIGS. 3A and 3B are diagrams illustrating software module configuration examples of the glasses-type wearable information device and the other wearable terminal, respectively, according to the present disclosure.
Figure 3B:
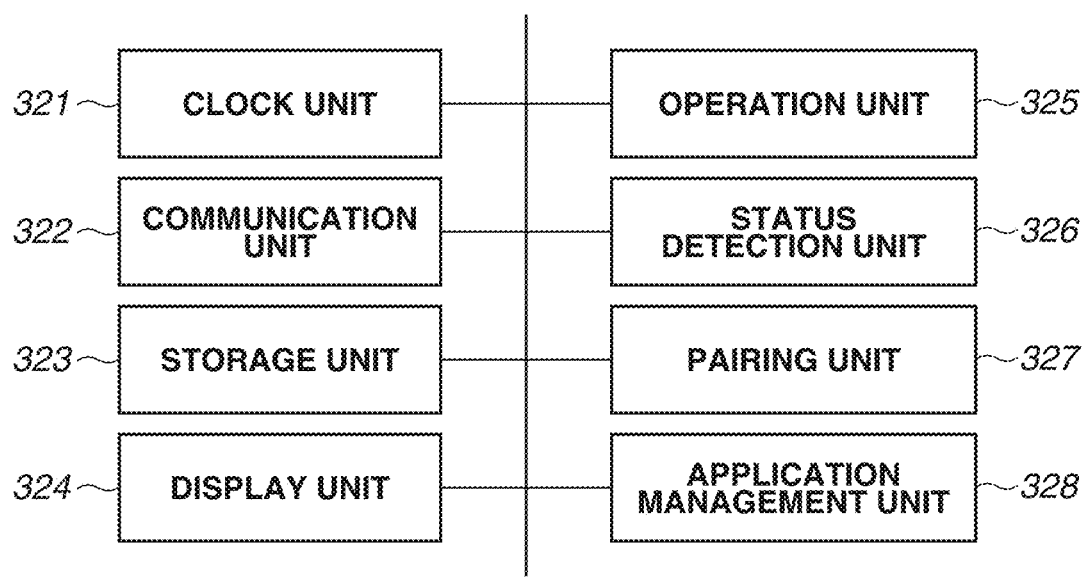

FIGS. 3A and 3B are diagrams illustrating software module configuration examples of the respective devices according to the present disclosure. FIG. 3A illustrates a software module configuration of the smart glasses 101.

A communication unit 301 transmits, to the smart watch 110, instruction information for the smart watch 110 and status information about the smart glasses 101. The communication unit 301 not only receives the instruction information transmitted from the smart watch 110, but also receives a notification from an application server that cooperates with the smart glasses 101 via the network using the network I/F 205. The status information indicates whether the smart glasses 101 are being used by the user, mode information (a standby mode, a power save mode, and the like) of the smart glasses 101, and the like. A storage unit 302 receives/exchanges information from/with the ROM 203, the RAM 204, and the other processing units. The storage unit 302 further stores therein image data captured by the camera 210, and the like.

A display unit 303 displays results of various types of applications executed by the CPU 201, such as AR/MR display. For example, the display unit 303 displays content (performs information projection) on the display 202 using an AR technique such that virtual content is superimposed on a physical space. The present disclosure can adopt a method of direct projection into the retinas. Here, in the information projection, a position and orientation of a device itself in the physical space may be estimated based on a technique such as simultaneous localization and mapping (SLAM). A result of the estimation is used in processing of displaying virtual content.

An operation unit 304 receives an input from the user with the frame 104, receives an instruction for an operation of an application of various types and an operation for display on the display 202, and performs control. A camera control unit 305 controls activation, stop, and imaging of the camera 210, and stores captured image data in the memory in cooperation with the storage unit 302. A mode control unit 306 controls switching between a plurality of modes of the smart glasses 101 so as to switch the smart glasses 101 to a mode desired by the user. A status detection unit 307 manages information about status change detected by the sensor unit 209, information about a use status, and the like, and holds the information in the memory. A pairing unit 308 controls the network I/F 205 to enable bidirectional data communication with the external network device via the wireless communication 120. An application management unit 309 manages an execution situation of an application of various types, version information, a notification received from the server, and the like, and manages the information in the memory via the storage unit 302.

FIG. 3B is a diagram illustrating a software module configuration of the smart watch 110.

A clock unit 321 manages and controls time information to be displayed on the display 222. The management and control of the time information may be performed by an application program stored in the ROM 223. A communication unit 322 not only transmits instruction information to the smart glasses 101 and receives status information about the smart glasses 101, but also receives a notification from the application server. A storage unit 323 receives/exchanges information from/with the ROM 223, the RAM 224, and the other processing units. A display unit 324 displays the time information managed by the clock unit 321 and a result of the application of various types executed by the CPU 221. The display unit 324 further displays an application notification transferred from the smart glasses 101. An operation unit 325 receives an input from the user with the display unit 111, and performs control of an operation of the application of various types and display on the display 222. A status detection unit 326 manages the status change detected by the sensor unit 229 as information, and holds the information with the memory. A pairing unit 327 controls the short-range communication I/F 225 to enable bidirectional data communication with the external network device via the wireless communication 120. An application management unit 328 manages an execution situation of the application of various types, version information, a notification received from the server, and the like, and manages the information in the memory via the storage unit 323.

The smart glasses 101 and the smart watch 110 both have, in the storage units 302 and 323, respectively, information about settings regarding whether to receive notifications from various types of applications executed inside or outside the respective devices, i.e., the smart glasses 101 and the smart watch 110. Table 1 is an example of an application notification setting table managed by the storage unit 302 of the smart glasses 101. For example, a notification setting (Notification) of "Application 0001", which has application identification information (Application ID) "0001", is valid (ON). The notification setting of "Application 0003", which has the application identification information "0003", is invalid (OFF). When information about an application is registered in the smart glasses 101 at a timing of installation of the application or the like, the notification setting becomes valid in response to the user's agreement with permission of the notification.

TABLE 1

| Application Notification Setting Table | | |
|---|---|---|
| Application ID | Application Name | Notification |
| 0001 | Application 0001 | ON |
| 0002 | Application 0002 | ON |
| 0003 | Application 0003 | OFF |

Each terminal controls whether to receive a notification on an application-by-application basis or whether to provide a received notification to the user in accordance with settings of the application notification setting table.

As a method of provision to the user, display control using the display 202 and the display 222 and notification using the vibration function can be employed as described above.

Furthermore, the smart glasses 101 and the smart watch 110 both have, in the storage units 302 and 323, respectively, information about settings regarding whether to transfer, in response to receiving notifications from applications executed inside or outside the respective devices, the notifications to other terminals in cooperation while the respective devices serve as notification sources. This setting can be made on an application-by-application basis. As a notification transfer destination, a terminal in cooperation based on pairing or the like can be designated. Information about an application serving as a notification transfer target can be shared between terminals in cooperation. That is, the information about the application from which a notification is transferred can be managed on a terminal side which becomes a transfer destination.

Table 2 is an example of a notification source management table managed by the storage unit 302 of the smart glasses 101. For example, a notification from "Application 0001", which has the application identification information "0001", is transferred to the smart watch 110 indicated by a terminal ID (watch_110) set in a transfer destination (TO). A notification from "Application 0003", which has the application identification information "0003", is transferred from the smart watch 110 indicated by the terminal ID (watch_110) set in a transfer source (FROM).

TABLE 2

Notification Transfer Management Table

| Application ID | Application Name | FROM | TO |
|---|---|---|---|
| 0001 | Application 0001 | — | watch_110 |
| 0002 | Application 0002 | — | watch_110 |
| 0003 | Application 0003 | watch_110 | — |

In a case where communication cannot be performed, such as in a case where pairing with a terminal designated as the transfer destination is canceled, the transfer of the notification is not executed. Even in a case where the notification is valid in Table 1 and the transfer destination is set in Table 2, a device serving as the transfer source can also perform display control and make a notification using the vibration function or the like. Thus, each of the smart glasses 101 and the smart watch 110 can also provide an identical notification from "Application 0001", which has the application identification information "0001", to the user.

The smart glasses 101 have several operation modes, and mode transition of the smart glasses 101 is controlled by the mode control unit 306 in accordance with the user's operation or a preset condition. Modes are defined as follows in the present exemplary embodiment, but are not limited thereto.

Standby mode: a status where the smart glasses 101 are on standby with low power consumption without ending an application in operation. The smart glasses 101 return to its original status in response to receiving an operation or a notification.

Concentration mode: an operation mode to which the smart glasses 101 make transition in accordance with an instruction from the user. The operation mode in which the smart glasses 101, which are being in use by the user, do not receive non-urgent information such as a notification from an application.

Power save mode: a status in which only part of applications, a network function, and a service operate in the background. Display using the display 202 is not executed. The smart glasses 101 while being worn can make transition to the power save mode.

Drive mode: a mode set by an instruction from the user or automatically set while the user is driving a vehicle or the like. The operation mode in which part of applications, such as a call application and a navigation application, can be used.

Figure 8:
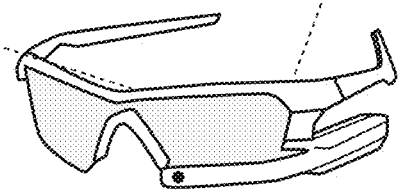
FIG. 8 is a diagram illustrating an example of notification settings in the glasses-type wearable information device.

FIG. 8 illustrates an example of virtual display of a setting screen for making notification settings in the smart glasses 101. A video projected by the display 202 into the field of vision of the user is assumed in this example. Similar settings can be made by accessing an external terminal, such as a personal computer (PC), via a user interface for a web server (not illustrated) provided by the smart glasses 101.

Figure 5A:
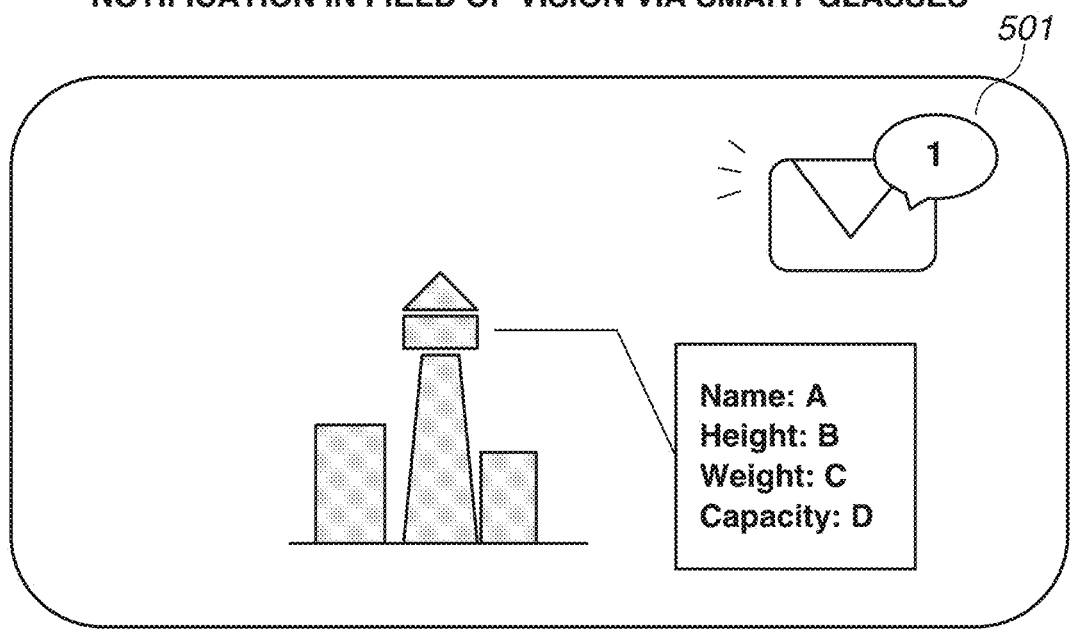
FIGS. 5A and 5B illustrate examples of display control in the glasses-type wearable information device and the other wearable terminal, respectively, according to the present disclosure.

A setting 801 represents a setting region in which a notification setting is made on a mode-by-mode basis. The user can set whether to provide a notification by using the display 202 into the field of vision of the user for the respective modes of the smart glasses 101. FIG. 8 illustrates a setting to not make a notification in the concentration mode and the drive mode, and make a notification in the power save mode. For example, FIG. 5A illustrates an example of a display pattern in a case where the smart glasses 101 receive a notification from a mail application. Display of a notification from the smart watch 110 is also controlled in accordance with this setting.

A setting 802 represents a region in which whether or not to transfer a notification to a paired device is set. In a case where the setting 802 is valid (ON), a notification from at least part of applications is transferred to the paired smart watch 110.

A setting 803 is an item to be set when the setting 802 is valid, and enables the setting of whether to restrict display control of a notification in the smart glasses 101 by the display 202 when a use status of the smart glasses 101 is a status in which the smart glasses 101 are not used by the user (not in use). In a case where the setting 803 is valid (ON), display of a notification in the smart glasses 101 by the display 202 is restricted when the smart glasses 101 are not in use. In a case where the setting 803 is invalid (OFF), on the other hand, display control of a notification is attempted in the smart glasses 101 when a condition for enabling the notification, such as an energized status, is satisfied even if the smart glasses 101 are not in use. A default setting of the setting 803 is valid.

A setting 804 represents a setting region for setting whether to transfer notifications from all applications, for which the respective notification settings managed by Table 1 are valid, to a paired device. In a case where the setting 803 is valid (ON), notifications from all applications are transferred. In a case where the setting 803 is invalid (OFF), an application to which a notification is transferred is selected from a list of applications for which the corresponding notification setting is valid. The notification from the application for which the setting is valid (ON) becomes a transfer target. A result of the setting is also used in Table 2 described above.

FIG. 4 is a flowchart illustrating notification control processing in the smart glasses 101. This processing is implemented by the CPU 201 executing a program including each step described below.

In step S401, the smart glasses 101 receive a notification from an application via the communication unit 301. Examples of an application notification according to the present exemplary embodiment include a notification received by an application installed in the smart glasses 101 from the application server (not illustrated) that cooperates with the smart glasses 101 via the network, such as the Internet 140. In addition, examples of the notification also include a notification (alarm or the like) automatically generated by the application installed in the smart glasses 101 or a notification generated by the user's operation.

In step S402, the smart glasses 101 refer to the application notification setting table (Table 1), and determines whether the notification setting of the target application is valid (ON). In a case where the smart glasses 101 determine in step S402 that the notification setting is OFF (NO in step S402), the processing ends. In a case where the smart glasses 101 determine in step S402 that the notification setting is ON (YES in step S402), the processing proceeds to step S403. In substitution for steps S401 and S402, the smart glasses 101 can implement control so as to request only a notification from an application with the notification setting valid to receive a notification therefrom.

In step S403, the smart glasses 101 refer to the notification transfer management table (Table 2) to determine whether the transfer destination (TO) of the notification is designated. In a case where the smart glasses 101 determine in step S403 that the transfer destination is not designated with respect to the target application (NO in step S403), the processing proceeds to step S409. In a case where the smart glasses 101 determine in step S403 that the transfer destination is designated (YES in step S403), the processing proceeds to step S404.

In step S404, the smart glasses 101 determine whether the use status of the smart glasses 101 is a status in which the smart glasses 101 are used (being in use) by the user. This step is skipped in a case where the setting 803 in FIG. 8 is invalid. In a case where the smart glasses 101 determine in step S404 that the smart glasses 101 are in use (YES in step S404), the processing proceeds to step S405. In a case where the smart glasses 101 determine in step S404 that the smart glasses 101 are not in use (NO in step S404), the processing proceeds to step S406.

The use status being "in use" means that display of AR/MR or the like using the display 202 is being performed in the smart glasses 101, control of the display is being performed in response to the user's operation, and the like. These statuses are detected and managed by the status detection unit 307. In a case where a frame of the smart glasses 101 is closed and the smart glasses 101 are in the power save mode without being worn, the smart glasses 101 may be determined as not being used (not in use). Also in a case where the smart glasses 101 are not worn and set in a dedicated case for the purpose of recharging a battery, the smart glasses 101 may be determined as not being used (not in use).

In step S405, the status detection unit 307 determines whether a current mode of the smart glasses 101 is a mode that is set as invalid in the setting 801 (such a mode is referred to as a predetermined mode). In a case where the status detection unit 307 determines in step S405 that the current mode is the predetermined mode (YES in step S405), the processing proceeds to step S406. In a case where the status detection unit 307 determines in step S405 that the current mode is not the predetermined mode (NO in step S405), the processing proceeds to step S407.

Figure 5B:
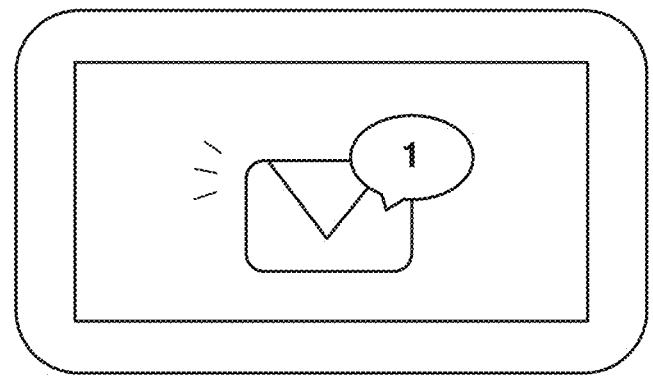

In step S406, the smart glasses 101 transfer the notification from the application to the paired smart watch 110. The display unit 324 of the smart watch 110 receives the notification from the smart glasses 101 via the communication unit 322, and displays the notification on the display 222 as illustrated in FIG. 5B.

In step S407, the display unit 303 of the smart glasses 101 controls display of the notification from the application using the display 202 as illustrated in FIG. 5A. In FIG. 5A, virtual display of a notification icon 501 is projected into the field of vision of the user. In step S408, the smart glasses 101 transfer the notification from the application to the paired smart watch 110, as in step S406.

In step S409, the status detection unit 307 determines whether the current mode of the smart glasses 101 is the predetermined mode as in step S405. In a case where the status detection unit 307 determines in step S409 that the current mode is the predetermined mode (YES in step S409), the processing ends. In a case where the status detection unit 307 determines in step S409 that the current mode is not the predetermined mode (NO in step S409), the processing proceeds to step S410. In step S410, the display unit 303 of the smart glasses 101 controls display of the notification from the application using the display 202 as in step S407.

In a case where the status detection unit 307 can detect that a terminal paired with the smart glasses 101 is not being worn by the user based on information about the terminal, the smart glasses 101 can also perform control so as not to execute the notification transfer processing in steps S406 and S408.

Since the smart glasses 101 are worn as glasses unlike a smartphone, a method of usage by the user is different from that of the smartphone. In addition to this, the smart glasses 101 can project a notification or the like into the field of vision of the user unlike the smartphone. Thus, during a specific work, driving of a vehicle, and the like, the notification may interrupt consciousness to the work or the driving and involve a risk or the like in some cases.

The first exemplary embodiment of the present disclosure enables flexible notification control with the smart glasses 101 and the paired device in accordance with the use status and operation mode of the smart glasses 101.

A second exemplary embodiment of the present disclosure will be described below. In the second exemplary embodiment, a description will be provided of notification control which is performed by the smart watch 110 in accordance with the use status and operation mode of the smart glasses 101. An internal configuration of a system, an internal configuration of each device, and the like are similar to those of the first exemplary embodiment unless otherwise described.

FIG. 6 is a flowchart illustrating application notification processing of the smart watch 110. This processing is implemented by the CPU 221 executing a program including each step described below. This flowchart describes processing in a case where a notification is generated from a clock application having an alarm function in the smart watch 110 or an application that provides health information, such as a blood pressure and a footstep count.

In step S601, the smart watch 110 detects a notification event from an application. In step S602, the smart watch 110 refers to the application notification setting table of the smart watch 110 and determines whether the notification setting of the target application is valid (ON). In a case where the smart watch 110 determines in step S602 that the notification setting of the target application is invalid (OFF) (NO in step S602), the processing ends. In a case where the smart watch 110 determines in step S602 that the notification setting of the target application is valid (YES in step S602), the processing proceeds to step S603.

In step S603, the display unit 324 of the smart watch 110 displays a notification from the target application on the display 222.

In step S604, the smart watch 110 refers to the notification transfer management table and determines whether the smart glasses 101, which is a paired device, is set as the transfer destination of the target application. In a case where the smart glasses 101 are set as the transfer destination (YES in step S604), the processing proceeds to step S605. In a case where the smart glasses 101 are not set as the transfer destination (NO in step S605), the processing ends.

In step S605, the smart watch 110 refers to the use status and mode of the smart glasses 101, and determines whether the smart glasses 101 are in a status where transfer is permitted. In a case where the smart watch 110 determines that the transfer is permitted (YES in step S605), the processing proceeds to step S606. In a case where the smart watch 110 determines that the transfer is not permitted (NO in step S605), the processing ends. Assume that the smart glasses 101 support a function of making a response with the use status and the mode in response to a request from the smart watch 110. The smart glasses 101 may support a function of notifying the smart watch 110 of a change event with respect to the use status and the mode. For example, in a case where the smart glasses 101 are not in use or the smart glasses 101 are in either the concentration mode or the drive mode, the smart watch 110 determines that transfer is not permitted in step S605, as in the first exemplary embodiment.

In step S606, the smart watch 110 transfers the notification from the application to the smart glasses 101 via the wireless communication 120. The display unit 303 of the smart glasses 101 controls display of the notification transferred from the application using the display 202.

A third exemplary embodiment of the present disclosure will be described. In the third exemplary embodiment, a description will be provided of processing performed in a case where a notification from an application is an exceptional notification including an urgent notification, such as specific disaster information. An internal configuration of a system, an internal configuration of each device, and the like are similar to those of the first exemplary embodiment unless otherwise described, and control of the present exemplary embodiment can be implemented in addition to the control of the first and second exemplary embodiments.

FIG. 7 is a flowchart illustrating notification control processing performed by the glasses-type wearable information device according to the third exemplary embodiment. A difference from the flowchart illustrated in FIG. 4 is herein described.

In step S701, the smart glasses 101 determine whether the notification from the application in step S401 via the communication unit 301 or the like is the exceptional notification described above. As described above, the exceptional notification includes the urgent notification including a notification of a natural disaster, a special alarm, information for protecting the public. In a case where the smart glasses 101 determine in step S701 that the notification is not the exceptional notification (NO in step S701), the processing proceeds to step S402. In a case where the smart glasses 101 determine in step S701 that the notification is the exceptional notification (YES in step S701), the processing proceeds to step S407.

The present exemplary embodiment enables obtaining of an advantageous effect of allowing the user to exceptionally check the exceptional notification both with the smart glasses 101 and the smart watch 110.

Other Exemplary Embodiment

The present disclosure includes a device or a system configured by combining the above-described exemplary embodiments as appropriate, and a method thereof.

Other Embodiment

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A glasses-type wearable information device connectable to the Internet using a built-in module, comprising:
   at least one memory storing instructions; and
   at least one processor executing the instructions causing the glasses-type wearable information device to:
      perform display control to project, into a field of vision of a user via the glasses type wearable information device, a setting screen related to a predetermined mode for suppressing a notification from one or more applications of the glasses-type wearable information device;
   wherein the setting screen is further configured to set a transfer setting for transferring the notification from the one or more applications to a paired device;
   store setting values related to the predetermined mode and the transfer setting in the glasses-type wearable information device;
   provide the setting screen to an external terminal to perform setting on a display device of the external terminal.

2. The glasses-type wearable information device according to claim 1, wherein the instructions further cause the glasses-type wearable information device to perform display control to project ea video regarding a notification issued by the application into the field of vision of the user when the glasses-type wearable information device is being worn by the user and is in use.

3. The glasses-type wearable information device according to claim 1, wherein the application is at least one of an application installed in the glasses-type wearable information device or an application that cooperates with the glasses-type wearable information device via a network.

4. The glasses-type wearable information device according to claim 1, further comprising a function for a voice call.

5. The glasses-type wearable information device according to claim 1, wherein the instructions further cause the glasses-type wearable information device to, in response to a notification being issued by the application while the glasses-type wearable information device is not being worn by the user or in the predetermined mode, transfer the notification to the paired device according to the stored transfer setting.

6. A method in a glasses-type wearable information device connectable to the Internet using a built-in module, the method comprising:
  performing display control to project, into a field of vision of a user via the glasses type wearable information device, a setting screen related to a predetermined mode for suppressing a notification from one or more applications of the glasses-type wearable information device;
  wherein the setting screen is further configured to set a transfer setting for transferring the notification from the one or more applications to a paired device;
  storing setting values related to the predetermined mode and the transfer setting in the glasses-type wearable information device; and
  providing the setting screen to an external terminal to perform setting on a display device of the external terminal.

7. A non-transitory computer-readable storage medium having computer executable instructions stored thereon, wherein the instructions cause a computer as a glasses-type wearable information device, which is connectable to the Internet using a built-in module, to:
  perform display control to project, into a field of vision of a user via the glasses type wearable information device, a setting screen related to a predetermined mode for suppressing a notification from one or more applications of the glasses-type wearable information device;
  wherein the setting screen is further configured to set a transfer setting for transferring the notification from the one or more applications to a paired device;
  store setting values related to the predetermined mode and the transfer setting in the glasses-type wearable information device;
  provide the setting screen to an external terminal to perform setting on a display device of the external terminal.

* * * * *